R. J. KLEINECK.
TIRE CHAIN.
APPLICATION FILED JAN. 12, 1921.
1,380,215.
Patented May 31, 1921.
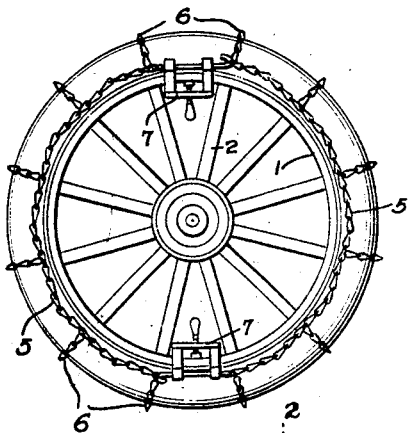
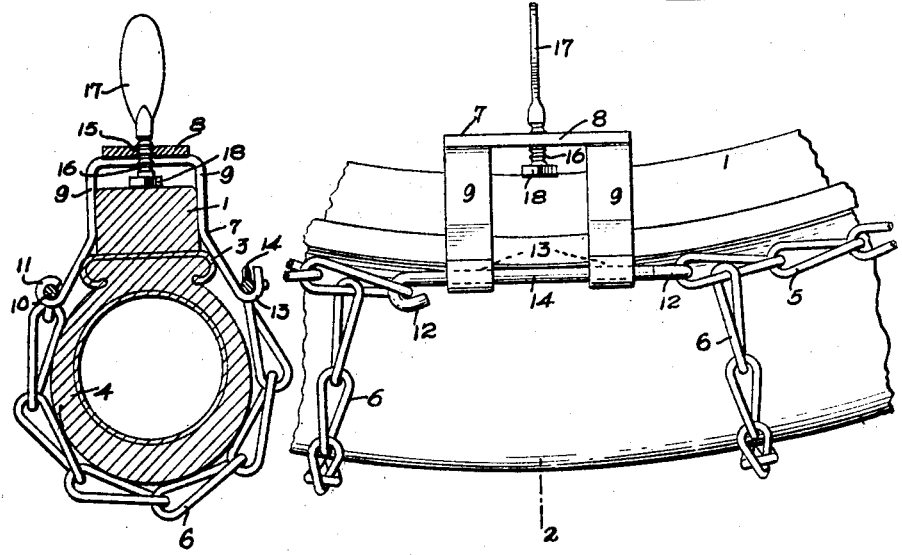
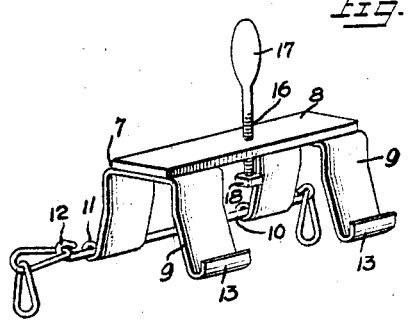
WITNESSES
H. J. Walker
F. J. Foster
INVENTOR
R. J. KLEINECK
BY Munn Co
ATTORNEYS

UNITED STATES PATENT OFFICE.

ROY J. KLEINECK, OF OXFORD JUNCTION, IOWA.

TIRE-CHAIN.

1,380,215. Specification of Letters Patent. Patented May 31, 1921.

Application filed January 12, 1921. Serial No. 436,762.

*To all whom it may concern:*

Be it known that I, ROY J. KLEINECK, a citizen of the United States, and a resident of Oxford Junction, in the county of Jones and State of Iowa, have invented a new and Improved Tire-Chain, of which the following is a full, clear, and exact description.

This invention relates to improvements in tire chains an object of the invention being to provide a chain comprising a plurality of sections which may be used either collectively or singly so that a single section may be utilized in case of emergency to release a car from a mud hole where it would be impossible to apply the ordinary chains without the use of a jack.

A further object is to provide means for removably securing the chain sections together and in place on a wheel and to provide a novel form of chain tightening device.

A still further object is to provide a device of the character stated which will be simple and practical in construction, strong, durable and efficient in use, a device which may be readily applied to a wheel and which will be comparatively inexpensive to manufacture.

With these and other objects in view the invention consists in certain novel features of construction and combinations and arrangements of parts as will be more fully hereinafter described and pointed out in the claims.

In the accompanying drawings—

Figure 1 is a view in side elevation of a wheel showing my improved chain in applied position.

Fig. 2 is a view in section on the line 2—2 of Fig. 3.

Fig. 3 is an enlarged fragmentary view in side elevation of one of the coupling members 7 and its associated parts.

Fig. 4 is a perspective view of one of the coupling members.

Referring in detail to the drawings, 1 represents the felly of a wheel 2. A rim 3 is used to clamp any conventional form of pneumatic tire 4 to the felly.

My improved annular anti-skid chain when assembled to completely encircle the tire includes the customary circumferential chains of links 5 connected by transverse chains 6. The circumferential chains 5 comprise a plurality of sections (preferably 2,) connected by suitable coupling members 7.

Each coupling member 7 includes a plate 8 at each end of which the intermediate portion of a substantially U-shaped member 9 is attached. The extremity of one leg of each member 9 is curved to permanently grip a rod 10 as indicated at 11. The rod 10 is provided at each end with hooks 12 permanently engaging the ends of one section of one of the chains 5 and removably engaging the end of the adjacent chain section.

The other leg of each member 9 is hook-shaped as indicated at 13 to removably engage a rod 14 similar to the rod 10 and connected to the ends of the sections of the chain 5 in a similar manner to the rod 10. Any appropriate number of cross chains 6 may be employed with each chain section and obviously the chain may be divided into a greater number of sections than I have illustrated.

The plates 9 are provided with centrally disposed threaded openings 15. Screws 16 fitting within the openings 15 are formed with wide finger receiving handles 17 at one end and disks or nuts 18 are fixedly connected to the other end of the screws.

In assembling the device on a tire the section of the chain which is permanently connected to the coupling devices is first placed in position. The coupling members 7 are positioned with the nuts or disks 18 engaging the inner face of the felly 1 and the legs of the members 9 straddling the felly. The rods 14 are passed around the tire and positioned in the hooks 13. The other chain section may then be placed around the tire and attached at its ends to the rods 12 and 14, after which the screws 16 are turned forcing the plates 8 inwardly from the felly and tightening the chains.

It is to be noted that one chain section may be placed in position and tightened upon that portion of the tire which is exposed when the wheel is embedded in a mud hole and that the chain may thus be used either as a complete device entirely encircling the tire or a single section may be used as an arcuate shoe partially encircling the tire.

Various slight changes and alterations might be made in the general form and arrangement of the parts described without departing from the spirit of the invention, and hence I do not limit myself to the precise details set forth but shall consider myself at liberty to make such slight changes and alterations as fairly fall within the spirit and scope of the appended claims.

What I claim is:—

1. An anti-skid chain for tires comprising a plurality of sections adapted to be removably connected and completely encircle a tire, rods, hooks on the ends of the rods removably engaging the ends of the sections, devices engageable with the rods and adapted to straddle a wheel felly and means for actuating said last-mentioned devices to tighten the chain.

2. The combination with a wheel felly and tire of an anti-skid chain encircling the tire, and comprising a plurality of sections, coupling members including plates, legs on the plates straddling the wheel felly, said legs including hooked extremities, rods engageable with the hooked extremities of the legs and with the ends of the chain sections, thumb screws associated with said plates and located against the inner face of the felly, said screws adapted when turned to pull said plates inwardly from the felly and tighten the chains.

ROY J. KLEINECK.